(12) United States Patent
Marathe et al.

(10) Patent No.: US 8,259,155 B2
(45) Date of Patent: Sep. 4, 2012

(54) PROVIDING PERSPECTIVE-DEPENDENT VIEWS TO VIDEO CONFERENCE PARTICIPANTS

(75) Inventors: Madhav V. Marathe, Cupertino, CA (US); Philip R. Graham, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1307 days.

(21) Appl. No.: 11/950,998

(22) Filed: Dec. 5, 2007

(65) Prior Publication Data

US 2009/0147070 A1    Jun. 11, 2009

(51) Int. Cl.
*H04N 7/14* (2006.01)
(52) U.S. Cl. .................... 348/14.08; 348/14.01
(58) Field of Classification Search .... 348/14.01–14.16; 370/260–271; 379/201.01, 202.01; 709/204
See application file for complete search history.

(56) References Cited

U.S. PATENT DOCUMENTS

| | | | |
|---|---|---|---|
| 6,151,062 A | 11/2000 | Inoguchi et al. | |
| 6,172,703 B1 | 1/2001 | Lee | 348/14.08 |
| 6,795,250 B2 | 9/2004 | Johnson et al. | 359/626 |
| 6,882,358 B1 | 4/2005 | Schuster et al. | 348/14.16 |
| 6,992,693 B2 | 1/2006 | Tajika et al. | 348/59 |
| 7,092,001 B2 | 8/2006 | Schulz | 348/14.05 |
| 7,515,174 B1 * | 4/2009 | Francisco et al. | 348/14.16 |
| 7,773,108 B2 * | 8/2010 | Hillis et al. | 348/14.16 |
| 2003/0210461 A1 | 11/2003 | Ashizaki et al. | |
| 2005/0195330 A1 | 9/2005 | Zacks et al. | |
| 2006/0191177 A1 | 8/2006 | Engel | 40/453 |
| 2007/0279483 A1 * | 12/2007 | Beers et al. | 348/14.08 |
| 2009/0146915 A1 | 6/2009 | Marathe | 345/7 |

OTHER PUBLICATIONS

*USPTO Office Action* for U.S. Appl. No. 11/951,033, in the name of Madhav V. Marathe, et al. 29 pages, Oct. 20, 2011.
Philips, "Multiview Lenticular Display," 1 page, 2004-2007.
Nguyen, "MultiView: Spatially Faithful Group Video Conferencing," 10 pages, Apr. 2-7, 2005.
Sharp News, "Sharp to Mass Produce World's First LCD to Simultaneously Display Different Information in Right and Left Viewing Directions," Sharp Corporation, 3 pages, Jul. 14, 2005.
Madhav V. Marathe, U.S. Appl. No. 11/951,033 Communication received from the U.S. Patent and Trademark Office dated Oct. 14, 2010, 24 pages.
Madhav V. Marathe, U.S. Appl. No. 11/951,033 Communication received from the U.S. Patent and Trademark Office dated Feb. 11, 2011, 28 pages.
Madhav V. Marathe, U.S. Appl. No. 11/951,033 Office Action received from the U.S. Patent and Trademark Office, dated Jun. 16, 2011, 27 pages.

(Continued)

*Primary Examiner* — Brian Ensey
(74) *Attorney, Agent, or Firm* — Baker Botts L.L.P.

(57) ABSTRACT

During a video conference between a local endpoint and a remote endpoint, a display at the local endpoint may be configured to provide perspective-dependent views to local video conference participants. A local endpoint may receive a plurality of video streams and identify a first video stream that provides a first view of a remote participant and a second video stream that provides a second view of that participant taken concurrently from a different angle. A display at the local endpoint may display the first video stream at a first viewing angle that only allows the first view of the remote participant to be seen from a first region. The display may also concurrently display the second video stream at a second viewing angle that only allows the second view of the remote participant to be seen from a second region different than the first region.

20 Claims, 7 Drawing Sheets

OTHER PUBLICATIONS

Response to Office Action dated Jun. 16, 2011 for U.S. Appl. No. 11/951,033 dated Sep. 16, 2011, pages.

Jerald et al., "Eye Gaze Correction for Videoconferencing," HRL Laboratories, LLC, pp. 77-81, 2002.

Yang et al., "Creating Adaptive Views for *Group* Video Teleconferencing—An Image-Based Approach," Department of Computer Science, University of North Carolina at Chapel Hill, 4 pages, 2002.

Pastoor et al., "3-D Displays: A review of current technologies," www.dgp.toronto.edu/~gf/Research/Volumetric . . . , pp. 1-24, Apr. 1, 1997.

Pastoor, et al., "3-D displays: A review of current technologies", Displays, 17, 1997, pp. 100-110.

\* cited by examiner

PROVIDING PERSPECTIVE-DEPENDENT VIEWS TO VIDEO CONFERENCE PARTICIPANTS

TECHNICAL FIELD

The present disclosure relates generally to telecommunications.

BACKGROUND

A video conference may exchange audio and video streams between participants at remote locations. Video streams received from a remote site may be displayed to local participants on one or more displays, and received audio streams may be played by speakers. However, a local display may not fully convey the non-verbal clues (e.g., eye gaze, pointing) provided by a remote speaker because the display may show the same view of the remote speaker to every local participant. For example, a remote speaker may look at the image of a local participant to indicate that the speaker is talking to that participant; however, that participant may not see the speaker's eye gaze and, thus, may have to rely on other clues in order to determine that the speaker is addressing him or her.

BRIEF DESCRIPTION OF THE DRAWINGS

For a more complete understanding of the present invention and its advantages, reference is made to the following description taken in conjunction with the accompanying drawings in which.

DESCRIPTION OF EXAMPLE EMBODIMENTS

Overview

In particular embodiments, a method for providing perspective-dependent views to video conference participants comprises receiving a plurality of video streams at a local endpoint from a remote endpoint, where the local endpoint and the remote endpoint are participating in a video conference involving a plurality of participants. A first video stream is identified from the plurality of video streams. The first video stream provides a first view of a remote participant at the remote endpoint. A second video stream is identified from the plurality of video streams. The second video stream provides a second view of the remote participant. The first view and the second view show images of the remote participant taken concurrently from different angles. The first video stream is displayed on a display at a first viewing angle that only allows a local participant to see the first view of the remote participant from a first region. The second video stream is displayed on the display at a second viewing angle that only allows the local participant to see the second view of the remote participant from a second region, where the second region is different than the first region.

Description

Figure 1:
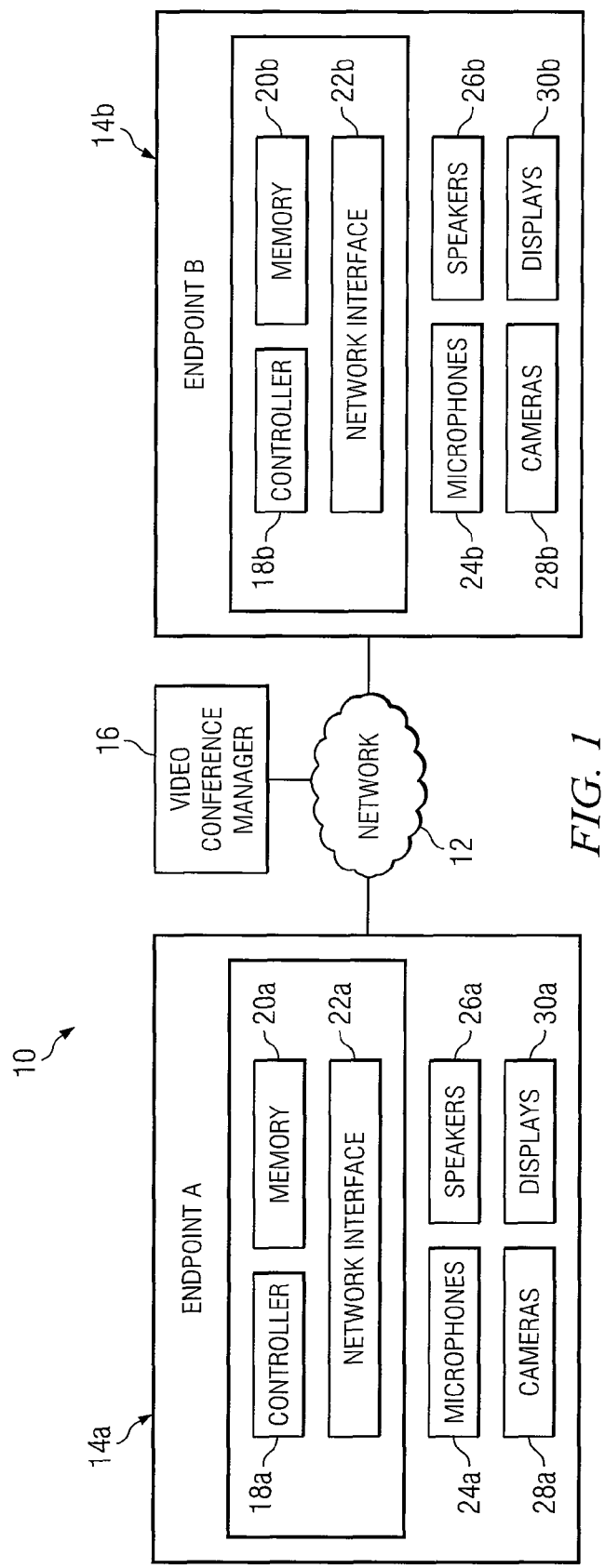
FIG. 1 illustrates a communications system that includes two endpoints engaged in a video conference.

FIG. 1 illustrates a communications system, indicated generally at 10, that includes two endpoints engaged in a video conference. As illustrated, communications system 10 includes network 12 connecting endpoints 14 and a videoconference manager 16. While not illustrated, communications system 10 may also include any other suitable elements to facilitate video conferences.

In general, during a video conference, a display at a local endpoint 14 is configured to concurrently display multiple video streams of a remote endpoint 14. These video streams may each include an image of the remote endpoint 14 as seen from different angles or perspectives. By allowing each video stream to be seen at a different angle, the local display may provide local participants with a perspective-dependent view of the remote site. By providing these perspective-dependent views, local participants may see and more easily interpret various non-verbal communications, such as eye contact and/or pointing, which may result in a more realistic video conferencing experience.

Network 12 interconnects the elements of communications system 10 and facilitates video conferences between endpoints 14 in communications system 10. While not illustrated, network 12 may include any suitable devices to facilitate communications between endpoints 14, videoconference manager 16, and other elements in communications system 10. Network 12 represents communication equipment including hardware and any appropriate controlling logic for interconnecting elements coupled to or within network 12. Network 12 may include a local area network (LAN), metropolitan area network (MAN), a wide area network (WAN), any other public or private network, a local, regional, or global communication network, an enterprise intranet, other suitable wireline or wireless communication link, or any combination of any suitable network. Network 12 may include any combination of gateways, routers, hubs, switches, access points, base stations, and any other hardware or software implementing suitable protocols and communications.

Endpoints 14 represent telecommunications equipment that supports participation in video conferences. A user of communications system 10 may employ one of endpoints 14 in order to participate in a video conference with another one of endpoints 14 or another device in communications system 10. In particular embodiments, endpoints 14 are deployed in conference rooms at geographically remote locations. Endpoints 14 may be used during a video conference to provide participants with a seamless video conferencing experience that aims to approximate a face-to-face meeting. Each endpoint 14 may be designed to transmit and receive any suitable number of audio and/or video streams conveying the sounds and/or images of participants at that endpoint 14. Endpoints 14 in communications system 10 may generate any suitable number of audio, video, and/or data streams and receive any suitable number of streams from other endpoints 14 participating in a video conference. Moreover, endpoints 14 may include any suitable components and devices to establish and facilitate a video conference using any suitable protocol techniques or methods. For example, Session Initiation Protocol (SIP) or H.323 may be used. Additionally, endpoints 14 may support and be inoperable with other video systems supporting other standards such as H.261, H.263, and/or H.264, as well as with pure audio telephony devices. As illustrated, endpoints 14 include a controller 18, memory 20, network interface 22, microphones 24, speakers 26, cameras 28, and displays 30. Also, while not illustrated, endpoints 14 may include any other suitable video conferencing equipment, for example, a speaker phone, a scanner for transmitting data, and a display for viewing transmitted data.

Controller 18 controls the operation and administration of endpoint 14. Controller 18 may process information and signals received from other elements such as network interface 22, microphones 24, speakers 26, cameras 28, and displays 30. Controller 18 may include any suitable hardware, software, and/or logic. For example, controller 18 may be a programmable logic device, a microcontroller, a microprocessor, any suitable processing device, or any combination of the preceding. Memory 20 may store any data or logic used by controller 18 in providing video conference functionality. In some embodiments, memory 20 may store all, some, or no data received by elements within its corresponding endpoint 14 and data received from remote endpoints 14. Memory 20 may include any form of volatile or non-volatile memory including, without limitation, magnetic media, optical media, random access memory (RAM), read-only memory (ROM), removable media, or any other suitable local or remote memory component. Network interface 22 may communicate information and signals to and receive information and signals from network 12. Network interface 22 represents any port or connection, real or virtual, including any suitable hardware and/or software that allow endpoint 14 to exchange information and signals with network 12, other endpoints 14, videoconference manager 16, and/or any other devices in communications system 10.

Microphones 24 and speakers 26 generate and project audio streams during a video conference. Microphones 24 provide for audio input from users participating in the video conference. Microphones 24 may generate audio streams from received sound waves. Speakers 26 may include any suitable hardware and/or software to facilitate receiving audio stream(s) and projecting the received audio stream(s) so that they can be heard by the local participants. For example, speakers 26 may include high-fidelity speakers. Endpoint 14 may contain any suitable number of microphones 24 and speakers 26, and they may each be associated with any suitable number of participants.

Cameras 28 and displays 30 generate and project video streams during a video conference. Cameras 28 may include any suitable hardware and/or software to facilitate capturing an image of one or more local participants and the surrounding area as well as sending the image to remote participants. Each video signal may be transmitted as a separate video stream (e.g., each camera 28 transmits its own video stream). In particular embodiments, cameras 28 capture and transmit the image of one or more users 30 as a high-definition video signal. Displays 30 may include any suitable hardware and/or software to facilitate receiving video stream(s) and displaying the received video streams to participants. For example, displays 30 may include a notebook PC, a wall mounted monitor, a floor mounted monitor, or a free standing monitor. In particular embodiments, one or more of displays 30 are plasma display devices or liquid crystal display devices. Endpoint 14 may contain any suitable number of cameras 28 and displays 30, and they may each be associated with any suitable number of local participants.

While each endpoint 14 is depicted as a single element containing a particular configuration and arrangement of modules, it should be noted that this is a logical depiction, and the constituent components and their functionality may be performed by any suitable number, type, and configuration of devices. In the illustrated embodiment, communications system 10 includes two endpoints 14a, 14b, but it is to be understood that communications system 10 may include any suitable number of endpoints 14.

Videoconference manager 16 generally coordinates the initiation, maintenance, and termination of video conferences between endpoints 14. Video conference manager 16 may obtain information regarding scheduled video conferences and may reserve devices in network 12 for each of those conferences. In addition to reserving devices or resources prior to initiation of a video conference, videoconference manager may monitor the progress of the video conference and may modify reservations as appropriate. Also, video conference manager 16 may be responsible for freeing resources after a video conference is terminated. Although video conference manager 16 has been illustrated and described as a single device connected to network 12, it is to be understood that its functionality may be implemented by any suitable number of devices located at one or more locations in communication system 10.

In an example operation, one of endpoints 14a, 14b initiates a video conference with the other of endpoints 14a, 14b. The initiating endpoint 14 may send a message to video conference manager 16 that includes details specifying the time of, endpoints 14 to participate in, and estimated duration of the desired video conference. Video conference manager 16 may then reserve resources in network 12 and may facilitate the signaling required to initiate the video conference between endpoint 14a and endpoint 14b. During the video conference, endpoints 14a, 14b may exchange one or more audio streams, one or more video streams, and one or more data streams. In particular embodiments, endpoint 14a may send and receive the same number of video streams as endpoint 14b. In certain embodiments, each of endpoints 14a, 14b send and receive the same number of audio streams and video streams. In some embodiments, endpoints 14a, 14b send and receive more video streams than audio streams.

During the video conference, each endpoint 14a, 14b may generate and transmit multiple video streams that provide different perspective-dependent views to the other endpoint 14a, 14b. For example, endpoint 14a may generate three video streams that each provide a perspective-dependent view of participants at endpoint 14a. These may show the participants at endpoint 14a from three different angles, e.g., left, center, and right. After receiving these video streams, endpoint 14b may concurrently display these three video streams on a display so that participants situated to the left of the display view one of the video streams, while participants situated directly in front of the display view a second of the video streams. Likewise, participants situated to the right of the display may view the third of the video streams. Accordingly, endpoint 14b may display different perspective-dependent views of remote participants to local participants. By providing different images to different participants, local participants may be able to more easily interpret the meaning of certain nonverbal clues (e.g., eye gaze, pointing) while looking at a two-dimensional image of a remote participant.

When the participants decide that the video conference should be terminated, endpoint 14a or endpoint 14b may send a message to video conference manager 16, who may then un-reserve the reserved resources in network 12 and facilitate signaling to terminate the video conference. While this video conference has been described as occurring between two endpoints—endpoint 14a and endpoint 14b—it is to be understood that any suitable number of endpoints 14 at any suitable locations may be involved in a video conference.

An example of a communications system with two endpoints engaged in a video conference has been described. This example is provided to explain a particular embodiment and is not intended to be all inclusive. While system 10 is depicted as containing a certain configuration and arrangement of elements, it should be noted that this is simply a logical depiction, and the components and functionality of system 10 may be combined, separated and distributed as appropriate both logically and physically. Also, the functionality of system 10 may be provided by any suitable collection and arrangement of components.

Figure 2A:
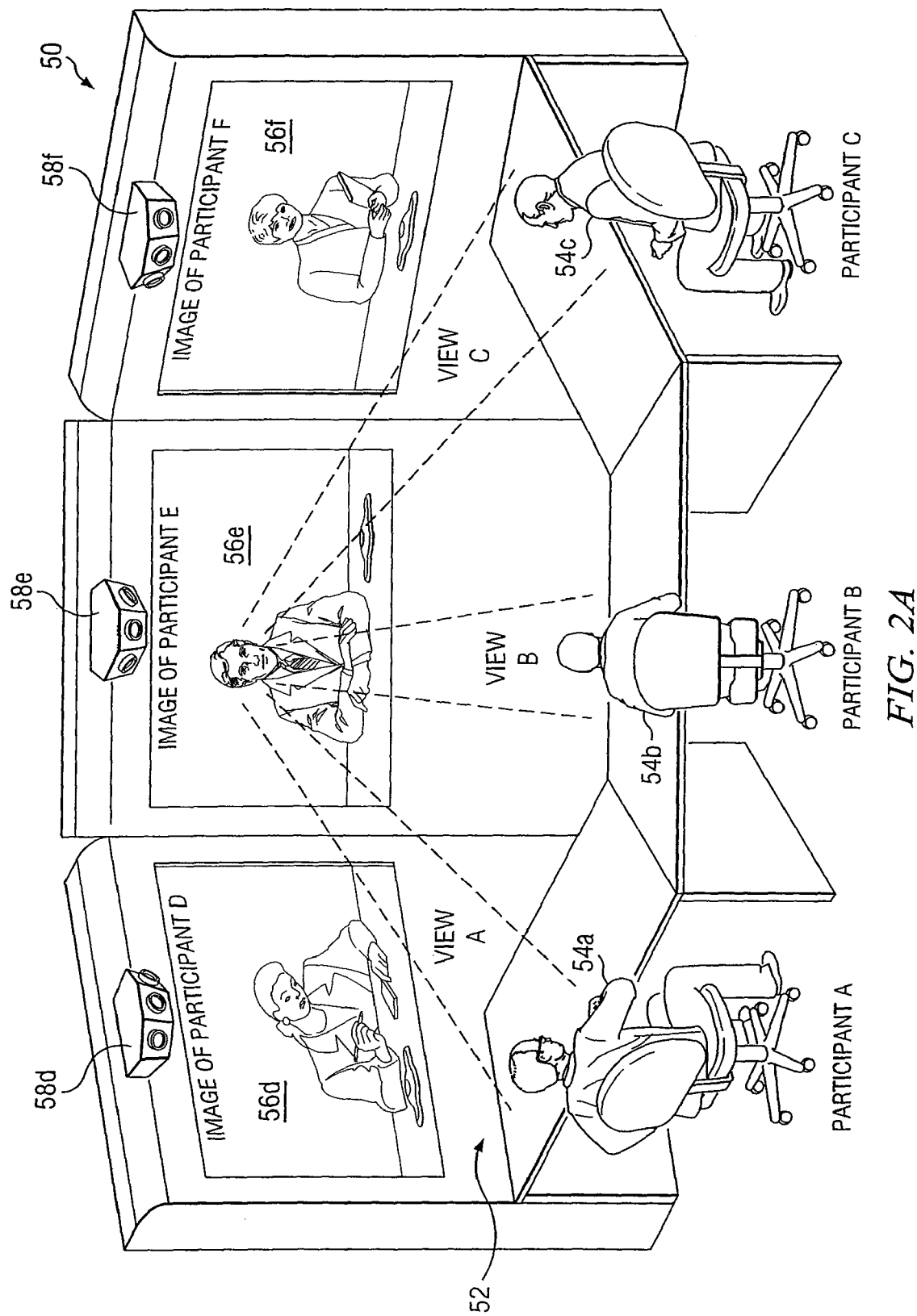
FIGS. 2A-2B illustrate endpoints that use cameras and multiple view display devices to concurrently provide local participants with perspective-dependent views of remote participants.
Figure 2B:
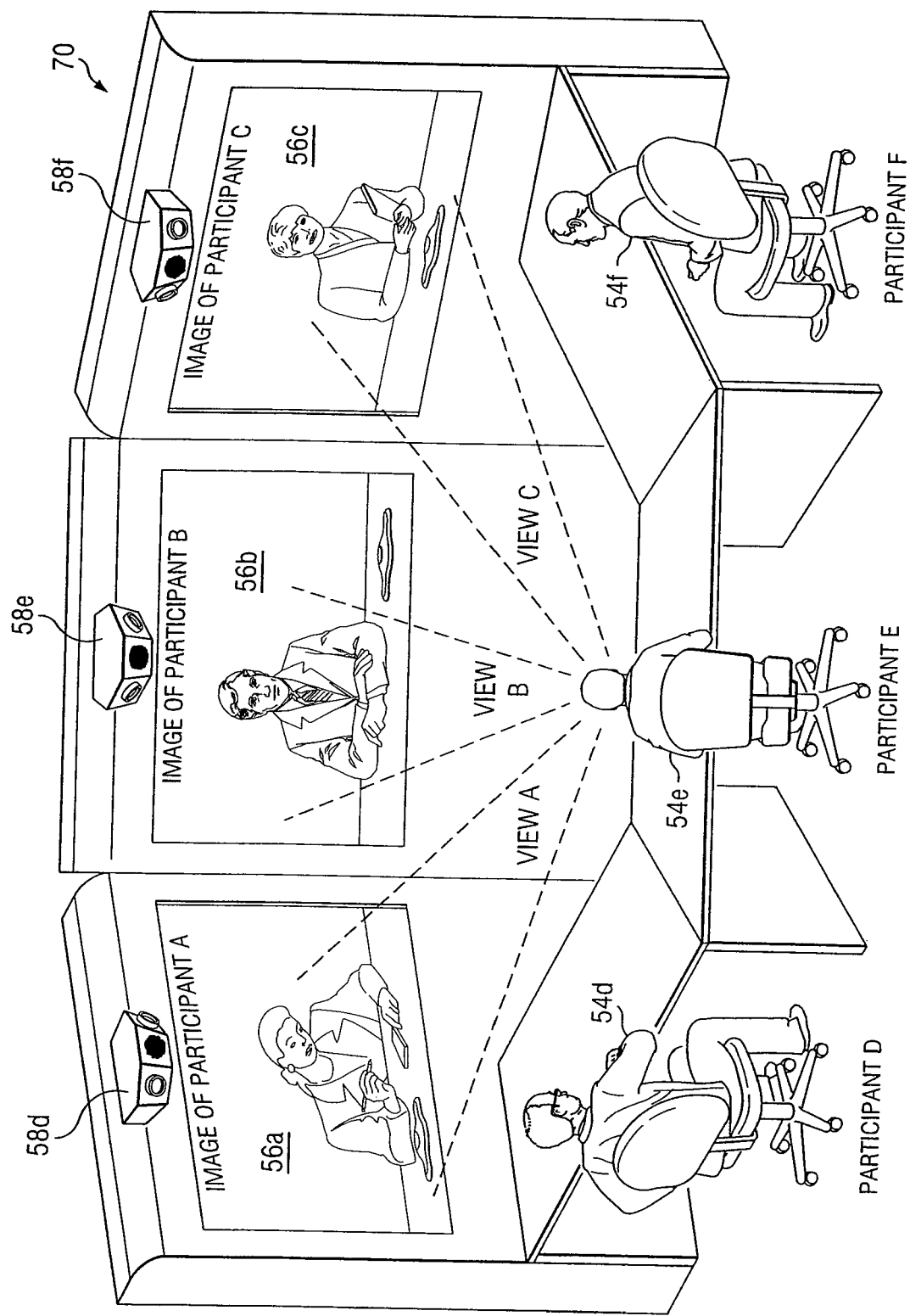

FIGS. 2A-2B illustrate endpoints, indicated generally at 50 and 70, that use cameras and multiple view display devices to concurrently provide local participants with perspective-dependent views of remote participants. As used throughout this disclosure, "local" and "remote" are used as relational terms to identify, from the perspective of a "local" endpoint, the interactions between and operations and functionality within multiple different endpoints participating in a video conference. Accordingly, the terms "local" and "remote" may be switched when the perspective is that of the other endpoint.

FIG. 2A illustrates an example of a setup that may be provided at endpoint 50. In particular embodiments, endpoint 50 is one of endpoints 14. As illustrated, endpoint 50 includes a table 52, three participants 54, three displays 56, and three camera clusters 58. While not illustrated, endpoint 50 may also include any suitable number of microphones, speakers, data input devices, data output devices, and/or any other suitable equipment to be used during or in conjunction with a video conference.

As illustrated, participants 54a, 54b, 54c are positioned around one side of table 52. On the other side of table 52 sits three displays 56d, 56e, 56f, and one of camera clusters 58d, 58e, 58f is positioned above each display 56d, 56e, 56f. In the illustrated embodiment, each camera cluster 58 contains three cameras, with one camera pointed in the direction of each of the local participants 54a, 54b, 54c. While endpoint 50 is shown having this particular configuration, it is to be understood that any suitable configuration may be employed at endpoint 50 in order to facilitate a desired video conference between participants at endpoint 50 and participants at a remote endpoint 14. As an example, camera clusters 58 may be positioned below or behind displays 56. Additionally, endpoint 50 may include any suitable number of participants 54, displays 56, and camera clusters 58.

In the illustrated embodiment, each display 56d, 56e, 56f shows one of the remote participants 54d, 54e, 54f. Display 56d shows the image of remote participant 54d; display 56e shows the image of remote participant 54e; and display 56f shows the image of remote participant 54f. These remote participants may be participating in the video conference through a remote endpoint 70, as is described below with respect to FIG. 2B. Using traditional methods, each local participant 54a, 54b, 54c would see the same image of each remote participant 54. For example, when three different individuals look at a traditional television screen or computer monitor, each individual sees the same two-dimensional image as the other two individuals. However, when multiple individuals see the same image, they may be unable to distinguish perspective-dependent non-verbal clues provided by the image. For example, remote participant 54 may point at one of the three local participants 54a, 54b, 54c to indicate to whom he is speaking. If the three local participants 54a, 54b, 54c view the same two-dimensional image of the remote participant 54, it may be difficult to determine which of the local participants 54 has been selected by the remote participant 54 because the local participants 54 would not easily understand the non-verbal clue provided by the remote participant 54.

However, displays 56 are configured to provide multiple perspective-dependent views to local participants 54. As an example, consider display 56e, which shows an image of remote participant 54e. In the illustrated embodiment, display 56e concurrently displays three different perspective-dependent views of remote participant 54e. Local participant 54a sees view A; local participant 54b sees view B; and participant 54c sees view C. Views A, B, and C all show different perspective-dependent views of remote participant 54e. View A may show an image of remote participant 54e from the left of remote participant 54e. Likewise, views B and C may show an image of remote participant 54e from the center and right, respectively, of remote participant 54e. In particular embodiments, view A shows the image of remote participant 54e that would be seen from a camera placed substantially near the image of local participant 54a that is presented to remote participant 54e. Accordingly, when remote participant 54e looks at the displayed image of local participant 54a, it appears (to local participant 54a) as if remote participant 54e were looking directly at local participant 54a. Concurrently, and by similar techniques, views B and C (shown to participants 54b and 54c, respectively) may see an image of remote participant 54e that indicated that remote participant 54e was looking at local participant 54a. In certain embodiments, displays 56 create multiple perspective-dependent views using lenticular lenses. For example, FIG. 3 illustrates a multiple view display device that employs lenticular lenses to provide different views to different participants. In some embodiments, displays 56 create multiple perspective-dependent views using barrier technology. In barrier technology, a physical channel (e.g., a grate or slat) guides light in a particular direction. For example, barrier technology may be used in privacy screens placed on laptops to restrict the angles at which the laptop screen can be viewed.

Camera clusters 58 generate video streams conveying the image of local participants 54a, 54b, 54c for transmission to remote participants 54d, 54e, 54f. These video streams may be generated in a substantially similar way as is described below in FIG. 2B with respect to remote endpoint 70. Moreover, the video streams may be displayed by remote displays 58 in a substantially similar way to that previously described for local displays 56d, 56e, 56f.

FIG. 2B illustrates an example of a setup that may be provided at the remote endpoint described above, indicated generally at 70. In particular embodiments, endpoint 70 is one of endpoints 14a, 14b in communication system 10. As illustrated, endpoint 70 includes a table 72, participants 54d, 54e, and 54f, displays 56, and camera clusters 58.

In the illustrated embodiment, three participants 54d, 54e, 54f local to endpoint 70 sit on one side of table 72 while three displays 56a, 56b, and 56c are positioned on the other side of table 72. Each display 56a, 56b, and 56c shows an image of a corresponding participant 54 remote to endpoint 70. These displays 56a, 56b, and 56c may be substantially similar to displays 56d, 56e, 56f at endpoint 50. These displayed participants may be the participants 54a, 54b, 54c described above as participating in a video conference through endpoint 50. Above each display 56 is positioned a corresponding camera cluster 58. While endpoint 70 is shown having this particular configuration, it is to be understood that any suitable configuration may be employed at endpoint 70 in order to facilitate a desired video conference between participants at endpoint 70 and a remote endpoint 14 (which, in the illustrated embodiment, is endpoint 50). As an example, camera clusters 58 may be positioned below or behind displays 56. Additionally, endpoint 70 may include any suitable number of participants 54, displays 56, and camera clusters 58.

As illustrated, each camera cluster 58a, 58b, 58c includes three cameras that are each able to generate a video stream. Accordingly, with the illustrated configuration, endpoint 70 includes nine cameras. In particular embodiments, fewer cameras are used and certain video streams or portions of a video stream are synthesized using a mathematical model. In other embodiments, more cameras are used to create multiple three dimensional images of participants 54. In some embodiments, the cameras in camera clusters 58 are cameras 28.

In each camera cluster 58, one camera is positioned to capture the image of one of the local participants 54d, 54e, 54f. Accordingly, each local participant 54d, 54e, 54f has three cameras, one from each camera cluster 58, directed towards him or her. For example, three different video streams containing an image of participant 54e may be generated by the middle camera in camera cluster 58a, the middle camera in camera cluster 58b, and the middle camera in camera cluster 58c, as is illustrated by the shaded cameras. The three cameras corresponding to local participant 54e will each generate an image of participant 54e from a different angle. Likewise, three video streams may be created to include different perspectives of participant 54d, and three video streams may be created to include different perspectives of participant 54f.

The images generated by the cameras in camera clusters 58a, 58b, 58c may be transmitted to remote endpoint 50. After correlating each video stream to its corresponding participant 54d, 54e, 54f, the video streams may be concurrently displayed on displays 56d, 56e, 56f as described above. Taking the three streams corresponding to participant 54e as an example, one of these three video streams may provide view A to participant 54a, as is illustrated in both FIGS. 2A & 2B. Likewise, a second video stream may provide view B to participant 54b, and the third video stream may provide view C to participant 54c.

In operation, camera clusters 58a, 58b, 58c at endpoint 70 may generate nine video streams containing different perspective-dependent views of participants 54d, 54e, 45f. For example, camera cluster 58a may generate a first video stream corresponding to participant 54d, a second video stream corresponding to participant 54e, and a third video stream corresponding to participant 54f. Likewise, camera clusters 58b, 58c may each generate three video streams—one corresponding to participant 54d, one corresponding to participant 54e, and one corresponding to participant 54f. Accordingly, in this particular embodiment, endpoint 70 will generate nine total video streams, including three perspective dependent views of participant 54d, three perspective dependent views of participant 54e, and three perspective dependent views of participant 54f. These video streams may be marked, organized, and/or compressed before they are transmitted to endpoint 50.

After receiving these video streams, endpoint 50 may identify the three video streams corresponding to participant 54d, the three video streams corresponding to participant 54e, and the three video streams corresponding to participant 54f. Endpoint 50 may then concurrently display the video streams corresponding to each particular participant 54d, 54e, 54f on that participant's corresponding display 56d, 56e, 56f. For example, display 56e may concurrently display three video streams corresponding to participant 54e. These three video streams may be displayed so that participant 54a views participant 54e from a first perspective, participant 54b views participant 54e from a second perspective, and participant 54c views participant 54e from a third perspective. These views may correspond to views A, B, and C, as illustrated in FIGS. 2A & 2B. Because display 56e may provide multiple perspective-dependent views of participant 54e to local participants 54a, 54b, 54c, those local participants may be able to more easily interpret non-verbal cues, such as eye gaze and pointing, given by participant 54e during a video conference. Displays 56d and 56f may operate similarly to display 56e. Additionally, while the transmission of video streams from endpoint 50 to endpoint 70 has been described in detail, it is understood that the transmission of video streams from endpoint 70 to endpoint 50 may include similar methods.

Particular embodiments of endpoints 50, 70 and their constituent components have been described and are not intended to be all inclusive. While these endpoints 50, 70 are depicted as containing a certain configuration and arrangement of elements, components, devices, etc., it should be noted that this is simply an example, and the components and functionality of each endpoint 50, 70 may be combined, separated and distributed as appropriate both logically and physically. In particular embodiments, endpoint 50 and endpoint 70 have substantially similar configurations and include substantially similar functionality. In other embodiments, each of endpoints 50, 70 may include any suitable configuration, which may be the same as, different than, or similar to the configuration of another endpoint participating in a video conference. Moreover, while endpoints 50, 70 are described as each including three participants 54, three displays 56, and three camera clusters 58, endpoints 50, 70 may include any suitable number of participants 54, displays 56, and camera clusters 58. In addition, the number of participant 54, displays 56, and/or camera clusters 58 may differ from the number of one or more of the other described aspects of endpoint 50, 70. Any suitable number of video streams may be generated to convey the image of participants 54 during a video conference.

Figure 3A:
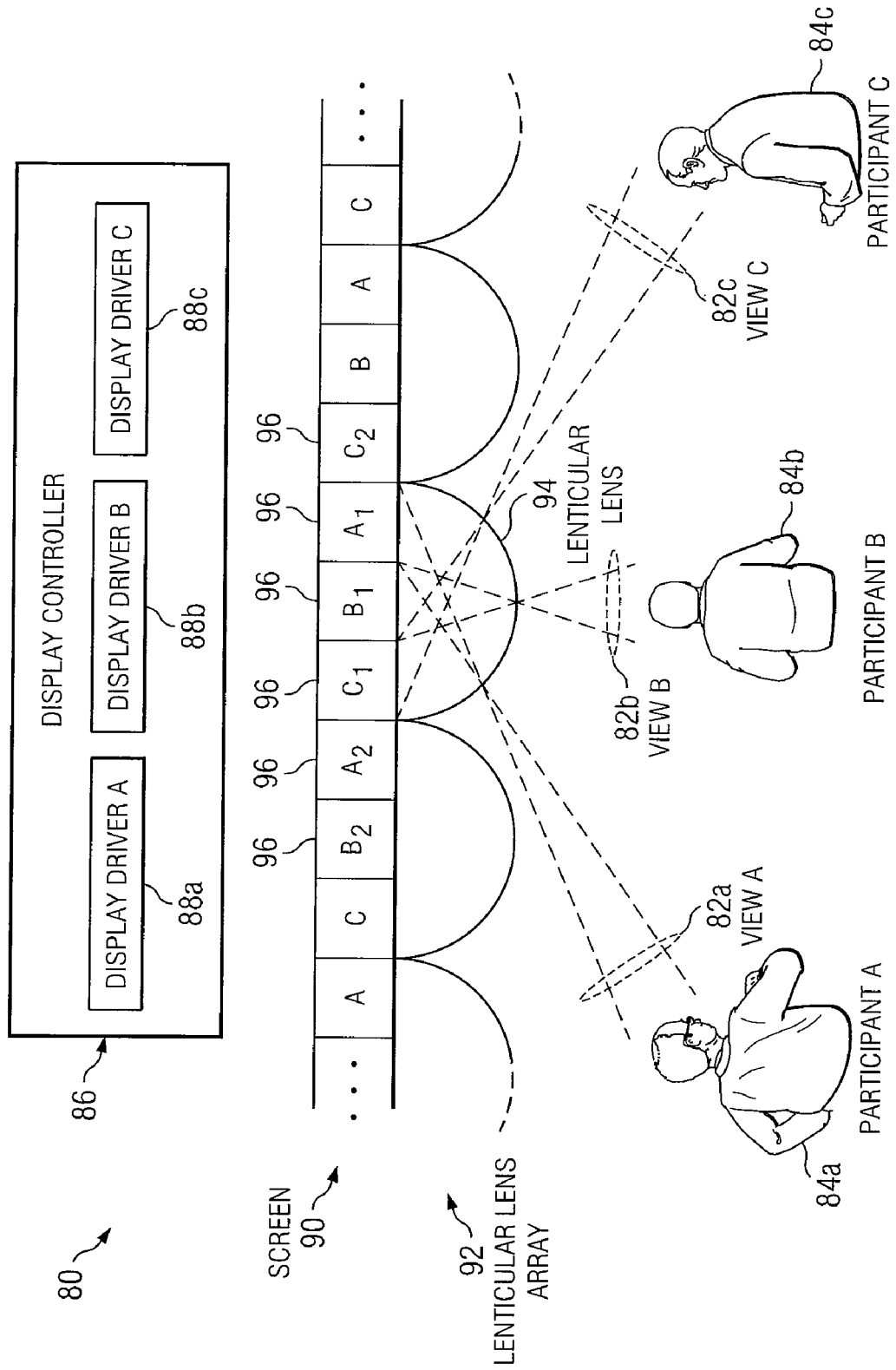
FIGS. 3A-3B illustrate a multiple view display device that employs lenticular lenses to provide different views to different participants.
Figure 3B:
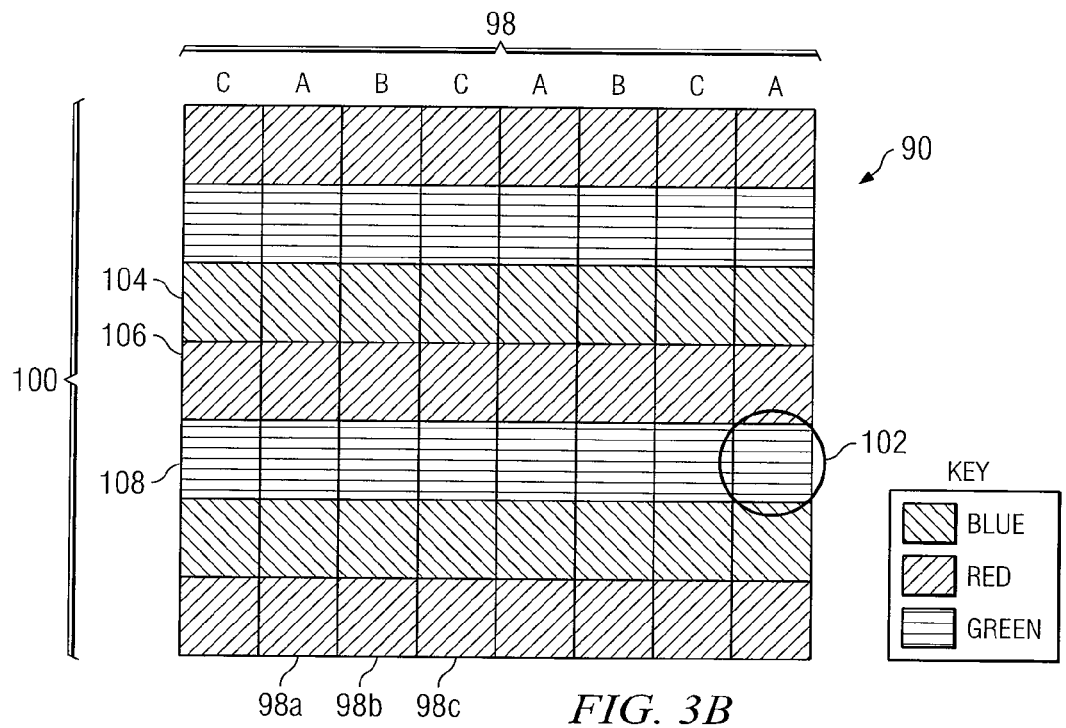

FIGS. 3A-3B illustrate a multiple view display device, indicated generally at 80, that employs lenticular lenses to provide different views to different participants. In the illustrated embodiment, three different views 82a, 82b, 82c are provided to three participants 84a, 84b, 84c. For example, these different views may correspond to views A, B, and C of participant 54e that are provided to participants 54a, 54b, 54c during a video conference. In particular embodiments, multiple view display device 80 is one of displays 56.

FIG. 3A shows a view from above multiple view display device 80, illustrating the different views 82a, 82b, 82c provided to participants 84a, 84b, 84c. As illustrated, multiple view display device 80 includes a display controller 86 that has three display drivers 88a, 88b, 88c, a screen 90, and a lenticular lens array 92 that includes lenticular lenses 94.

Display controller 86 receives data corresponding to images to be displayed by multiple view display 80 and drives the illumination of pixels 96 on screen 90. In the illustrated embodiment, display controller 86 includes three display drivers 88a, 88b, 88c. Display driver 88a may be responsible for controlling a first portion of screen 90 corresponding to a first displayed image. Display driver 88b may be responsible for controlling a second portion of screen 90 corresponding to a second displayed image. Display driver 88c may be responsible for controlling a third portion of screen 90 corresponding to a third displayed image.

A partial row of pixels 96 on screen 90 is illustrated. Pixels 96 may be divided into three portions, or sets. In the illustrated row of pixels 96, set A includes pixels $96a_1$, $96a_2$, set B includes pixels $96b_1$, $96b_2$, and set C includes pixels $96c_1$, $96c_2$. Each set of pixels 96a, 96b, 96c may correspond to a different image to be displayed by a multiple view display 80. In particular embodiments, these different images are different perspective-dependent views of a particular participant 54 or participants 54 participating in a video conference. In other embodiments, any suitable images may be simultaneously displayed on multiple view display device 80. As used herein, "image" is meant to broadly encompass any visual data or information. As an example, an image may be a still image. As another example, may be the result of displaying a video stream.

Lenticular lens array 92 may be placed adjacent to screen 90 and may include a plurality of lenticular lenses 94. In the illustrated embodiment, lenticular lens 94 is shown from a top-view. As is partially illustrated, other lenticular lenses 94 may be placed next to lenticular lens 94 to form lenticular lens array 92. Each lenticular lens 94 may be shaped similar to a cylinder cut in half along its diameter. Accordingly, looking at a single row of screen 90, lenticular lens 94 appears to be a semi-circle with a diameter substantially equal to the width of three pixels 96. While lenticular lens array 92 is illustrated as having lenticular lens 94 extend vertically on screen 90, lenticular lens array 92 may incorporate lenticular lenses 94 extending horizontally, diagonally, or in any other suitable manner. In particular embodiments, lenticular lens 94 is substantially semicircular. In some embodiments, lenticular lens 94 is a smaller or larger arc of a cylinder. In other embodiments, lenticular lens 94 may take a variety of different shapes, and two particular examples are described with respect to FIGS. 4A & 4B.

Generally, lenticular lens 94 focuses the light generated by pixels 96 to provide a plurality of views. As illustrated, lenticular lens 94 focuses the light generated by: pixel $96a_2$ into view 82a seen by participant 84a; pixel $96b_1$ into view 82b seen by participant 84b; and pixel $96c_1$ into view 82c seen by participant 84c. While not illustrated, other lenticular lenses 94 in lenticular lens array 92 may focus pixels 96 in the different pixel groups 96a, 96b, 96c in a similar manner. By focusing light in this way, pixel group 96a (with view 82a) may be seen by participant 84a, but not by participant 84b or participant 84c. Similarly, pixel group 96b (with view 82b) may be seen by participant 84b, but not by participant 84a or participant 84c, and pixel group 96c (with view 82c) may be seen by participant 84c, but not by participant 84a or participant 84b. Accordingly, in the illustrated embodiment of multiple view display device 80, a first image may be displayed using pixels 96 in pixel group 96a, a second image may be concurrently displayed using pixels 96 in pixel group 96b, and a third image may be concurrently displayed using pixels 96 in pixel group 96c. These three images may then be seen by a respective one of participants 84a, 84b, 84c.

In an example operation, display controller 86 may receive a plurality of video streams to be displayed on multiple view display device 80. Display controller 86 may identify the received video stream(s) that correspond to view 82a, view 82b, and view 82c. Then, display controller 86 may send the video stream corresponding to view 82a to display driver 88a, the video stream corresponding to view 82b to display driver 88b, and the video stream corresponding to view 82c to display driver 88c. Each display driver 88a, 88b, 88c may control the operation of the corresponding set of pixels 96a, 98b, 98c. For example, display driver 88a may display a first video stream on pixel group 96a, display driver 88b may concurrently display a second video stream on pixel group 96b, and display driver 88c may concurrently display a third video stream on pixel group 96c. The light emitted by each of these pixel groups 96a, 96b, 96c may be focused into a different view 82a, 82b, 82c. These views 82a, 82b, 82c may be seen by corresponding participants 84a, 84b, 84c. Accordingly, a first participant 84a may see a first video stream because it is displayed with pixel group 96a, while second and third participants 84b, 84c see second and third video streams because they are displayed with pixel groups 96b, 96c, respectively.

In particular embodiments, multiple view display device 80 displays multiple video streams. In other embodiments, multiple view display device 80 displays multiple still images. In certain embodiments, multiple view display device 80 displays any suitable number of video streams and/or still images. For example, in one embodiment, multiple view display device 80 may be configured to concurrently display two images—one video image and one still image. In addition, while multiple view display device 80 has been described in conjunction with a communications system and endpoints that support a video conference, it is to be understood that multiple view display device 80 may be used in a variety of different applications.

FIG. 3B illustrates an expanded view of a portion of screen 90. As illustrated, screen 90 is shown from a horizontal angle. In particular embodiments, the illustrated portion of screen 90 represents a small percentage of screen 90 as it would be seen by participants 84.

As illustrated, screen 90 is comprised of a plurality of pixels 96 and constituent sub-pixels arranged in a matrix having columns 98 and rows 100. Columns 98 comprise a first set of columns (designated with A), a second set of columns (designated with B), and a third set of columns (designated with C). Column 98a may include pixels in pixel group 96a, column 98b may include pixels in pixel group 96b, and column 98c may include pixels in pixel group 96c. Accordingly, as described above, column 98a (and other columns 98 belonging to set A) may display a first image to a first participant 84a, column 98b (and other columns 98 belonging to set B) may concurrently display a second image to a second participant 84b, and column 98c (and other columns 98 belonging to set C) may display a third image to a third participant 84c.

In the illustrated embodiment, rows 100 divide pixels 96 into blue, red, and green sub-pixels 102. A first row 104 may include blue sub-pixels 102, a second row 106 may include red sub-pixels 102, and a third row 108 may include green sub-pixels. This blue, red, green combination may repeat along rows 100. Three rows 104, 106, 108 of sub-pixels 102 may be employed in order to generate the image created by one particular pixel 96, and that one particular pixel may correspond to pixel group 96a, pixel group 96b, or pixel group 96c.

Particular embodiments of a multiple view display device 80 have been described and are not intended to be all inclusive. While the multiple view display device is depicted as containing a certain configuration and arrangement of elements, components, devices, etc., it should be noted that this is simply an example, and the components and functionality of the devices may be combined, separated and distributed as appropriate both logically and physically. For example, while screen 90 is described and illustrated as being comprised of pixels 96 having sub-pixels 102, it is understood that any suitable design may be used.

Moreover, while the illustrated embodiment shows columns 98 as vertical components of the matrix and rows 100 as horizontal components of the matrix, it is to be understood that a "column" (as the term is used herein) can have any linear orientation (i.e., vertical, horizontal, or diagonal) and a "row" (as the term is used herein) can have any linear orientation. For example, rows 100 of blue, red, and green subpixels 102 may each be oriented vertically, while columns 98 of pixel groups 96a, 96b, and 96c are oriented horizontally. Also, a "pixel" may be any suitable component, device, or element that emits light. In particular embodiments, screen 90 is a plasma display device, which includes a matrix of rows and columns. Finally, the functionality of the multiple view display devices may be provided by any suitable collection and arrangement of components.

Figure 4A:
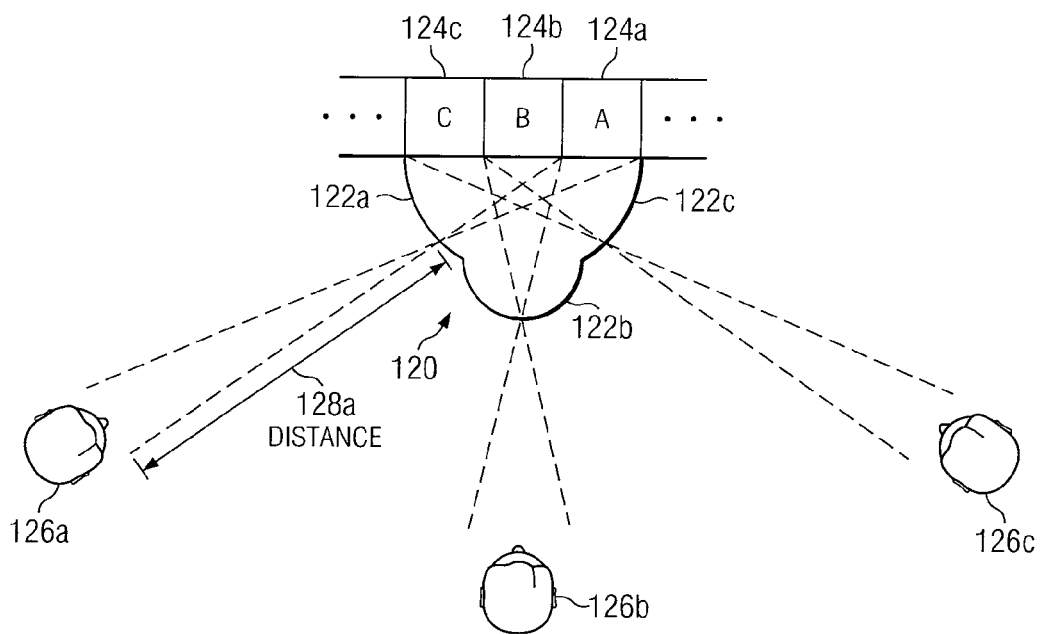
FIGS. 4A-4B illustrate example lenticular lens designs for use in multiple view display devices.
Figure 4B:
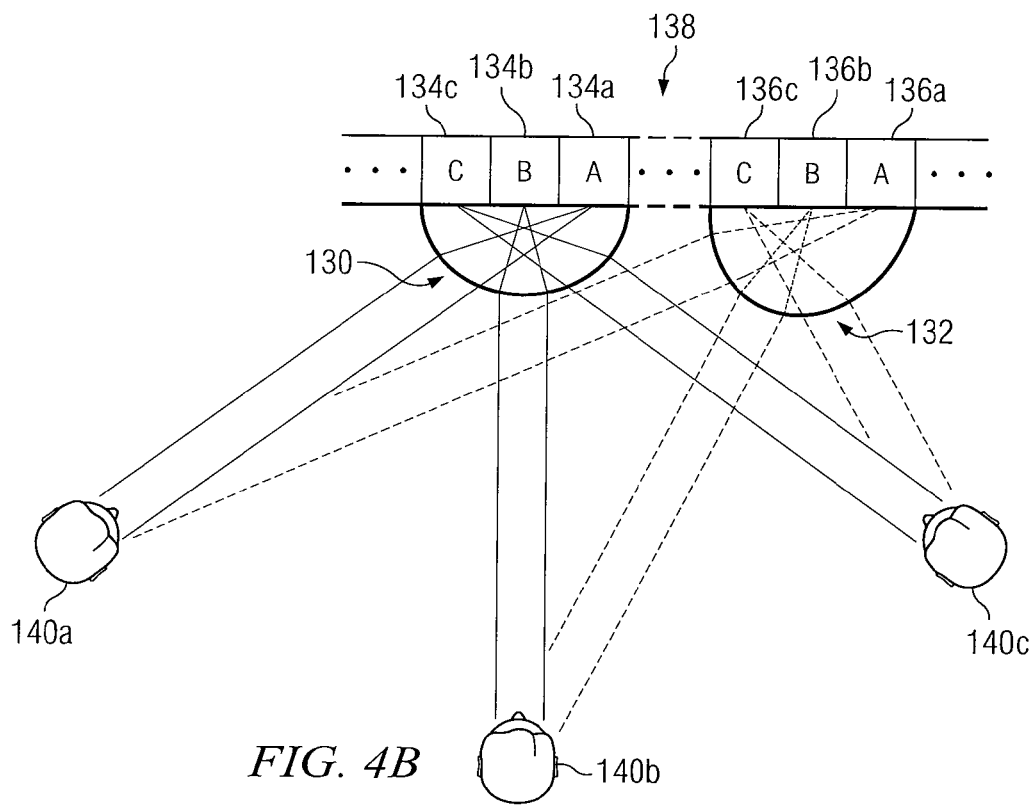

FIGS. 4A-4B show example lenticular lens designs for use in multiple view display devices. In particular embodiments, these multiple view display devices are multiple view display device 80.

FIG. 4A illustrates a lenticular lens indicated generally at 120. Lenticular lens 120 may be lenticular lens 94 in lenticular lens array 92. As illustrated, lenticular lens 120 includes three sub-lenses 122a, 122b, 122c. Sub-lenses 122 may be designed to focus light emitted by a corresponding pixel 124. For example, sub-lens 122a may be configured with a specific curvature that will focus the light generated by pixel 124a on participant 126a. In particular embodiments, the design of sub-lens 122a takes into account the distance 128 between participant 126a and sub-lens 122a. The design of sub-lens 122a may also take into account the distance between sub-lens 122a and pixel 124a.

Likewise, sub-lens 122b may be designed so that the light emitted by pixel 124b is properly focused for participant 126b, and sub-lens 122c may be designed so that the light emitted by pixel 124c is properly focused for participant 126c. As illustrated, the distance between a first participant 126 and a corresponding sub-lens 122 may differ from the distance between a second participant 126 and a corresponding sub-lens 122. As is also illustrated, the distance between a first pixel (e.g., pixel 124a) and its corresponding sub-lens 122 will differ from the distance between another pixel (e.g., pixel 124b) and its corresponding sub-lens 122. In order to accommodate these different optical situations, sub-lenses 122a, 122b, 122c may have different curvatures, thicknesses, or indices of refraction.

FIG. 4B illustrates a first lenticular lens, indicated generally at 130, located at the left of a screen 138 and a second lenticular lens, indicated generally at 132, located at the right of screen 138. Lenticular lens 130 and lenticular lens 132 may have different structures to accommodate the different optical situations encountered by light emitted by pixels located on different ends of the same screen.

Lenticular lens 130 focuses light from pixels 134a, 134b, and 134c while lenticular lens 132 focuses light generated by pixels 136a, 136b, and 136c. As illustrated, screen 138 can be viewed by three participants 140: participant 140a views screen 138 from the left, participant 140b views screen 138 from the center, and participant 140c views screen 138 from the right. As can also been seen in the figure, the distance between a particular participants 140 and lenticular lens 130 may be different from the distance between that participant 140 and lenticular lens 132. For example, the distance between participant 140a and lenticular lens 130 is much less than the distance between participant 140a and lenticular lens 132. As another example, the distance between lenticular lens 130 and participant 140c is much greater than the distance between lenticular lens 132 and participant 140c. Because of the differing distances between a given participant 140a, 140c and a given lenticular lenses 130, 132, the shape of lenticular lens 130 may differ from the shape of lenticular lens 132. By altering the shape of different lenticular lenses, such as lenticular lens 130 and lenticular lens 132, a lenticular lens array may provide an improved image to participant by more accurately focusing the view seen by that participant. Similarly, other lenticular lenses (not illustrated) that are located between lenticular lens 130 and lenticular lens 132 may gradually incorporate the changes found between these lenticular lenses 130, 132. Each lenticular lens may be designed provide the most effective user experience that focuses the relevant pixels 134, 136 for a particular participant 140.

Additionally, participants 140 may view additional displays 56 (not illustrated). For example, one display may include a second screen placed to the left of screen 138 and a second display may include a third screen placed to the right of screen 138. These second and third screens may include lenticular lens arrays which include lenticular lenses. The lenticular lenses within each lenticular lens arrays may differ from each other; and these lenticular lens arrays may differ from one another. In particular embodiments, enhanced multiple view displays are accomplished by altering the shape of each lenticular lens within a lenticular lens array and each lenticular lens array associated with each multiple view display shown to video conference participants.

Particular examples of lenticular lens designs and lenticular lens array designs have been described and are not intended to be all inclusive. While the designs are described and depicted as containing a certain configuration and including certain elements, it should be noted that these are simply examples.

Figure 5:
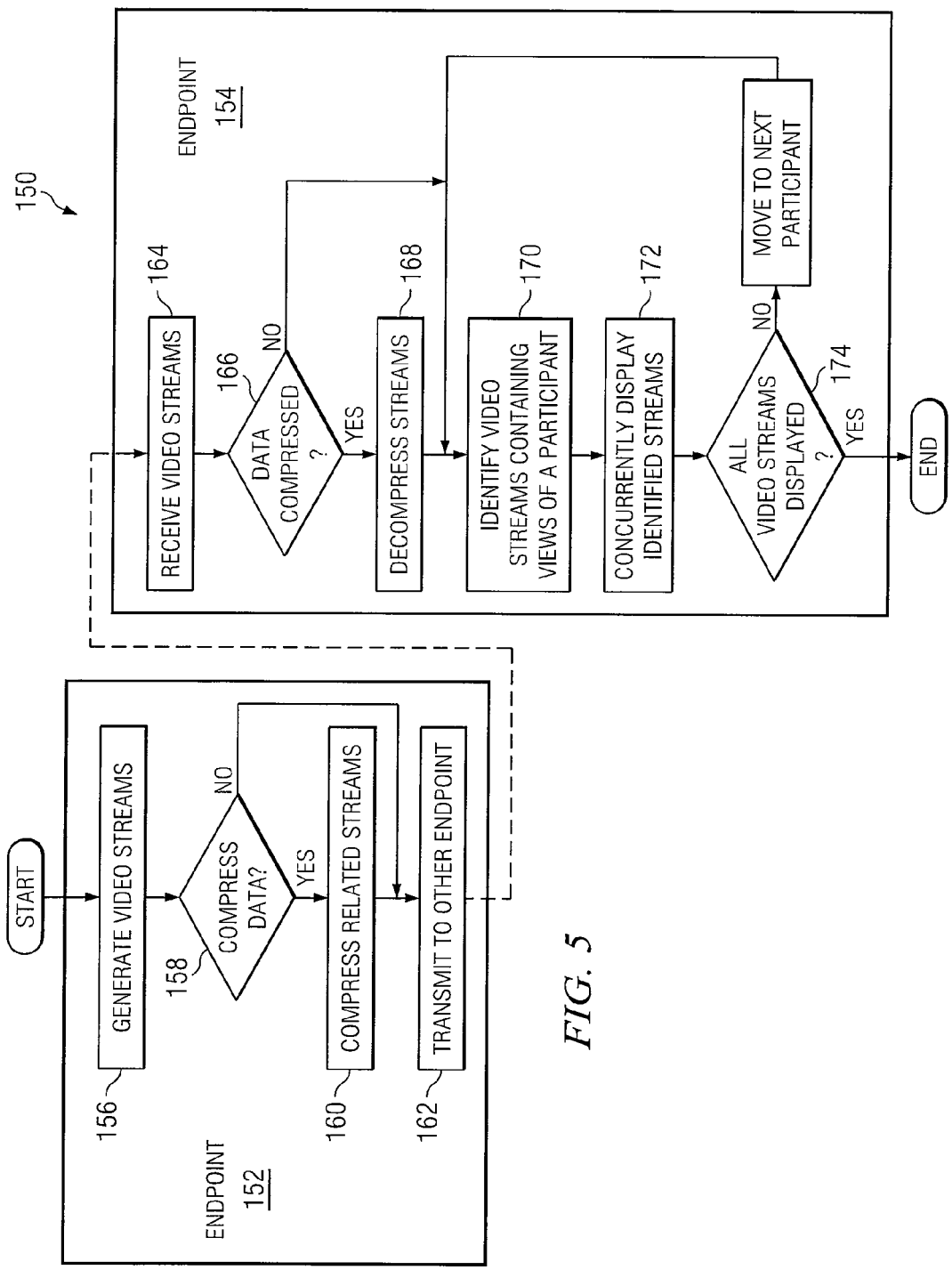
FIG. 5 is a flowchart illustrating a method by which a first endpoint sends video streams to a second endpoint so that the second endpoint may concurrently provide different local participants with perspective-dependent views of one or more remote participants.

FIG. 5 is a flowchart illustrating a method, indicated generally at 150, by which a first endpoint sends video streams to a second endpoint so that the second endpoint may concurrently provide different local participants with perspective-dependent views of one or more remote participants. As illustrated, method 150 shows the operations of an endpoint 152 and an endpoint 154 participating in a video conference. In particular embodiments, endpoint 152 and/or endpoint 154 may be endpoint 14, endpoint 50, and/or endpoint 70.

At step 156, endpoint 152 generates video streams to be sent to endpoint 154 during a video conference. For example, one or more camera clusters 58 at endpoint 152 may generate a plurality of video streams that each include an image of one or more participants involved in the video conference through endpoint 152. Camera clusters 58 may include one or more cameras, such as cameras 28. In particular embodiments, endpoint 152 generates nine video streams that include three perspective-dependent views of each of three participants. In other embodiments, endpoint 152 generates a number of video streams equal to the number of local participants 54 multiplied by the number of remote participants 54. Accordingly, each remote participant 54 may receive his or her own perspective-dependent view of each local participant 54. In other embodiments, more or fewer video streams may be generated by endpoint 152.

After generating the video streams, endpoint 152 determines whether or not to compress this data, in step 158. The determination may be based on a variety of factors, for example, the bandwidth available for a video conference, the degree to which related video streams may be compressed, and other suitable factors. If endpoint 152 decides to compress one or more video streams, it compresses the determined video streams in step 160; otherwise, method 150 proceeds to step 162. For example, endpoint 152 may compress the video streams corresponding to different perspective-dependent views of the same participant 54. After this compression, multiple generated video streams may be sent as a single video stream. In particular embodiments, different views of a single participant 54 may be compressible because there may be redundancy in the different images. In certain embodiments, endpoint 152 may use any suitable techniques to compress or reduce the bandwidth requirements of the generated video streams. At step 162, endpoint 152 transmits the video stream(s) to endpoint 154.

At step 164, endpoint 154 receives the video streams from the endpoint 152. Endpoint 154 may then determine whether or not endpoint 152 compressed the received video stream data, in step 166. In particular embodiments, endpoint 154 analyzes information carried by the received data in order to determine whether or not the video streams were compressed. In other embodiments, endpoint 154 determine that endpoint 152 compressed the video stream(s) based upon pre-established parameters for the video conference. If endpoint 152 compressed the video stream data, endpoint 154 decompresses the video stream data in step 168; otherwise, endpoint 154 skips step 168.

At step 170, endpoint 154 identifies all video streams containing perspective dependent views of a particular participant 54 at endpoint 152. In particular embodiments, endpoint 154 may select a first participant 54 and may identify all video streams corresponding to that participant 54. Once these video streams have been identified, endpoint 154 may concurrently display the identified streams on a multiple view display, in step 172. In particular embodiments, different video streams containing images of the particular participant 54 are displayed to different participants at endpoint 154. In particular embodiments, a multiple view display is multiple view display device 80. At step 174, endpoint 154 determines whether or not all video streams have been displayed. If not, method 150 proceeds to step 176 where endpoint 154 identifies the next participant 54. Then, endpoint 154 identifies the video streams containing views of that participant 54, in step 170. When endpoint 154 determines, in step 174, that all video streams are displayed, method 150 ends.

The method described with respect to FIG. 5 is merely illustrative, and it is understood that the manner of operation and devices indicated as performing the operations may be modified in any appropriate manner. While the method describes particular steps performed in a specific order, it should be understood that this is merely a logical description and various steps may be performed concurrently and/or in any appropriate order. For example, endpoint 154 is described as identifying the video streams corresponding to a particular participant 54 and displaying those streams before moving to the next participant 54; however, it is to be understood that, in many embodiments, this identification and display is processed in parallel. In particular embodiments, a similar operation occurs for the generation, transmission, and display of video streams from endpoint 154 to endpoint 152. Moreover, communications system 10 contemplates any suitable collection and arrangement of elements performing some, all, or none of these steps.

Figure 6:
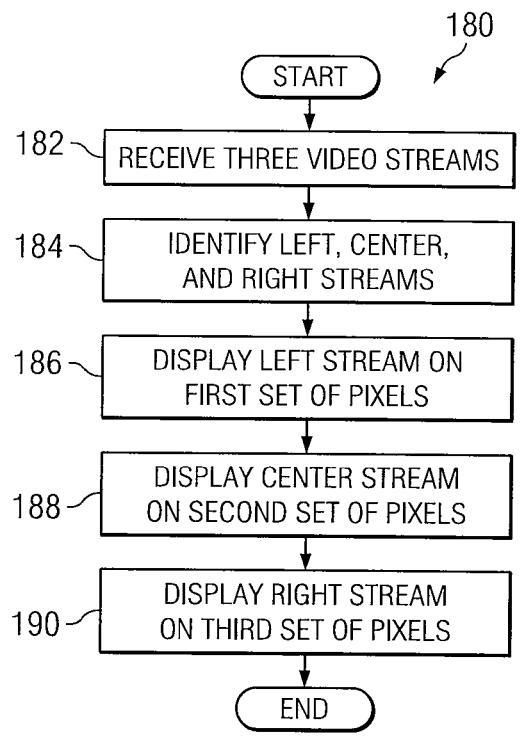
FIG. 6 is a flowchart illustrating a method by which a multiple view display device employing a lenticular lens array may provide different views to participants.

FIG. 6 is a flowchart illustrating a method, indicated generally at 180, by which a multiple view display device employing a lenticular lens array may provide different views to participants.

At step 182, multiple view display device 80 receives three video streams. In particular embodiments, each video stream corresponds to a different perspective-dependent view of a remote participant that is involved in a video conference. In other embodiments, rather than receiving video streams, multiple view display device 80 receives data containing a still image. At step 184, a display controller (e.g., display controller 86) identifies a left stream, a center stream, and a right stream. In particular embodiments, the left stream is displayed to a participant 84 on the left side of multiple view display device 80. In other embodiments, any suitable method may be used to determine which received stream should be displayed at which display location.

At step 186, display driver 88a displays the left stream on the first set of pixels. For example, the first set of pixels may correspond with pixel group 96a, which includes, for example, pixels $96a_1$ and $96a_2$. The image generated by these pixels may be focused by lenticular lenses in a lenticular lens array (e.g., lenticular lenses 94 in lenticular lens array 92) in order to provide a first view to a first participant (e.g., view 82a to participant 84a). At step 188, display driver 88b displays the center video stream on a second set of pixels. The center stream may include a second image different than the image displayed by the left stream. This image may be a different perspective of the same remote participant participating in a video conference. In particular embodiments, the second set of pixels corresponds to pixel group 96b, which includes, for example, pixels $96b_1$ and $96b_2$. The image generated by these pixels may be focused by lenticular lenses in a lenticular lens array (e.g., lenticular lenses 94 in lenticular lens array 92) in order to provide a second view to a second participant (e.g., view 82b to participant 84b). At step 190, display driver 88c displays the right stream on a third set of pixels. The right stream may include a third image different than the image displayed by the left stream and different than the image displayed by the center stream. This image may be a different perspective of the same remote participant. In particular embodiments, the third set of pixels corresponds to pixel group 96c, which includes, for example, pixels $96c_1$ and $96c_2$. The image generated by these pixels may be focused by lenticular lenses in a lenticular lens array (e.g., lenticular lenses 94 in lenticular lens array 92) in order to provide a third view to a third participant (e.g., view 82c to participant 84c). By displaying different streams on different sets of pixels and focusing the light generated by those pixels with a lenticular lens array, a multiple view display device may concurrently provide different perspective-dependent images to different participants. After step 190, method 180 ends.

The method described with respect to FIG. 6 is merely illustrative, and it is understood that the manner of operation and devices indicated as performing the operations may be modified in any appropriate manner. While the method describes particular steps performed in a specific order, it should be understood that communications system 10 contemplates any suitable collection and arrangement of elements performing some, all, or none of these steps in any operable order.

Although the present invention has been described in several embodiments, a myriad of changes and modifications may be suggested to one skilled in the art, and it is intended that the present invention encompass such changes and modifications as fall within the present appended claims.

What is claimed is:

1. A method comprising:
    receiving a plurality of video streams at a local endpoint from a remote endpoint, the local endpoint and the remote endpoint participating in a video conference involving a plurality of participants;
    identifying a first video stream in the plurality of video streams, the first video stream providing a first view of a remote participant at the remote endpoint;
    identifying a second video stream in the plurality of video streams, the second video stream providing a second view of the remote participant, the first view and the second view showing images of the remote participant taken concurrently from different angles;
    displaying the first video stream on a display at a first viewing angle that only allows a local participant to see the first view of the remote participant from a first region; and displaying the second video stream on the display at a second viewing angle that only allows the local participant to see the second view of the remote participant from a second region, the second region different than the first region.

2. The method of claim 1, wherein:
the display comprises a lenticular lens array including a plurality of lenticular lenses; and
each lenticular lens is configured to direct light emitted by a first column of pixels toward the first region and to direct light emitted by a second column of pixels toward the second region.

3. The method of claim 1, further comprising:
identifying a third video stream in the plurality of video streams, the third video stream providing a third view of the remote participant, wherein the first view, the second view, and the third view provide images of the remote participant taken concurrently from different angles; and
displaying the third video stream on the display at a third viewing angle that only allows the local participant to see the third view of the remote participant from a third region, the third region different than the first region and different than the second region.

4. The method of claim 3, wherein:
the display comprises a lenticular lens array including a plurality of lenticular lenses; and
each lenticular lens is configured to direct light emitted by a first column of pixels toward the first region, to direct light emitted by a second column of pixels toward the second region, and to direct light emitted by a third column of pixels toward the third region.

5. The method of claim 1, wherein:
the first viewing angle allows a first local participant in the first region to see the first view and prohibits a second local participant in the second region from seeing the first view; and
the second viewing angle allows the second local participant to see the second view and prohibits the first local participant from seeing the second view.

6. The method of claim 1, wherein the remote endpoint synthesizes the first video stream and the second video stream using a single camera and a mathematical model.

7. The method of claim 1, wherein the display is able to display the first video stream and the second video stream using barrier technology.

8. The method of claim 1, further comprising decompressing one or more of the plurality of video streams.

9. An apparatus comprising:
a network interface operable to receive a plurality of video streams at a local endpoint from a remote endpoint, the local endpoint and the remote endpoint participating in a video conference involving a plurality of participants;
a controller operable to identify a first video stream in the plurality of video streams, the first video stream providing a first view of a remote participant at the remote endpoint, the controller further operable to identify a second video stream in the plurality of video streams, the second video stream providing a second view of the remote participant, the first view and the second view providing images of the remote participant taken concurrently from different angles; and
a display operable to display the first video stream at a first viewing angle that only allows a local participant to see the first view of the remote participant from a first region, the display further operable to display the second video stream at a second viewing angle that only allows the local participant to see the second view of the remote participant from a second region, the second region different than the first region.

10. The apparatus of claim 9, wherein:
the display comprises a lenticular lens array including a plurality of lenticular lenses; and
each lenticular lens is configured to direct light emitted by a first column of pixels toward the first region and to direct light emitted by a second column of pixels toward the second region.

11. The apparatus of claim 9, wherein:
the controller is further operable to identify a third video stream in the plurality of video streams, the third video stream providing a third view of the remote participant, wherein the first view, the second view, and the third view provide images of the remote participant taken concurrently from different angles; and
the display is further operable to display the third video stream at a third viewing angle that only allows the local participant to see the third view of the remote participant from a third region, the third region different than the first region and different than the second region.

12. The apparatus of Claim 11, wherein:
the display comprises a lenticular lens array including a plurality of lenticular lenses; and
each lenticular lens is configured to direct light emitted by a first column of pixels toward the first region, to direct light emitted by a second column of pixels toward the second region, and to direct light emitted by a third column of pixels toward the third region.

13. The apparatus of claim 9, wherein:
the first viewing angle allows a first local participant in the first region to see the first view and prohibits a second local participant in the second region from seeing the first view; and
the second viewing angle allows the second local participant to see the second view and prohibits the first local participant from seeing the second view.

14. The apparatus of claim 9, wherein the remote endpoint synthesizes the first video stream and the second video stream using a single camera and a mathematical model.

15. The apparatus of claim 9, wherein the display is operable to display the first video stream and the second video stream using barrier technology.

16. The apparatus of claim 9, wherein the controller is further operable to decompress one or more of the plurality of video streams.

17. An apparatus comprising:
means for receiving a plurality of video streams at a local endpoint from a remote endpoint, the local endpoint and the remote endpoint participating in a video conference involving a plurality of participants;
means for identifying a first video stream in the plurality of video streams, the first video stream providing a first view of a remote participant at the remote endpoint;
means for identifying a second video stream in the plurality of video streams, the second video stream providing a second view of the remote participant, the first view and the second view providing images of the remote participant taken concurrently from different angles;
means for displaying the first video stream on a display at a first viewing angle that only allows a local participant to see the first view of the remote participant from a first region; and
means for displaying the second video stream on the display at a second viewing angle that only allows the local participant to see the second view of the remote participant from a second region, the second region different than the first region.

18. The apparatus of claim 17, wherein:
the display comprises a lenticular lens array including a plurality of lenticular lenses; and
each lenticular lens is configured to direct light emitted by a first column of pixels toward the first region and to direct light emitted by a second column of pixels toward the second region.

19. The apparatus of claim 17, further comprising:
means for identifying a third video stream in the plurality of video streams, the third video stream providing a third view of the remote participant, wherein the first view, the second view, and the third view provide images of the remote participant taken concurrently from different angles; and
means for displaying the third video stream on the display at a third viewing angle that only allows the local participant to see the third view of the remote participant from a third region, the third region different than the first region and different than the second region.

20. The apparatus of claim 17, wherein:
the first viewing angle allows a first local participant in the first region to see the first view and prohibits a second local participant in the second region from seeing the first view; and
the second viewing angle allows the second local participant to see the second view and prohibits the first local participant from seeing the second view.

* * * * *